Jan. 25, 1938. W. F. GROENE 2,106,501
CHUCK
Filed Aug. 17, 1936 2 Sheets-Sheet 1
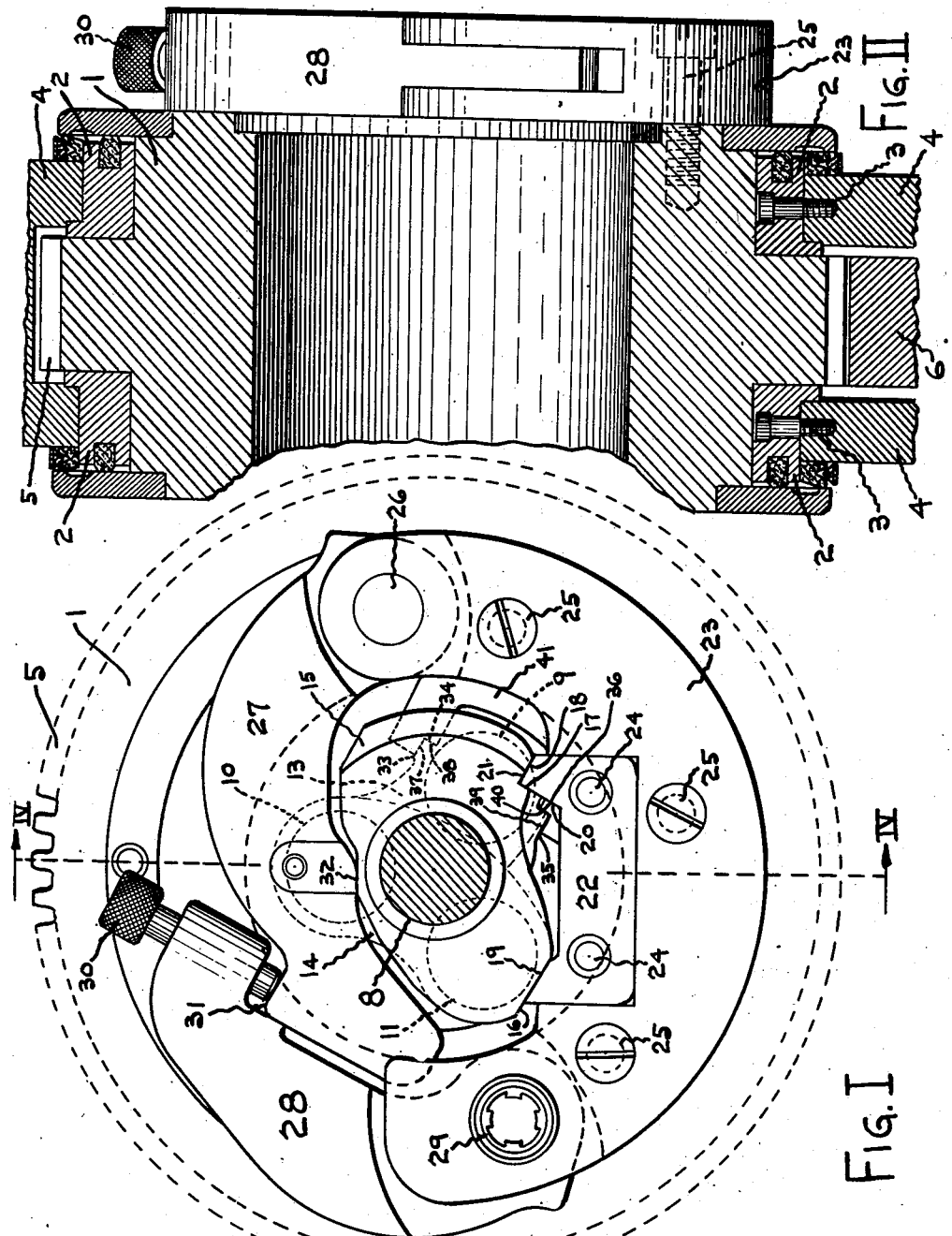
INVENTOR.
WILLIAM F. GROENE.
BY
Allen & Allen
ATTORNEY.

Jan. 25, 1938.　　　W. F. GROENE　　　2,106,501
CHUCK
Filed Aug. 17, 1936　　　2 Sheets-Sheet 2
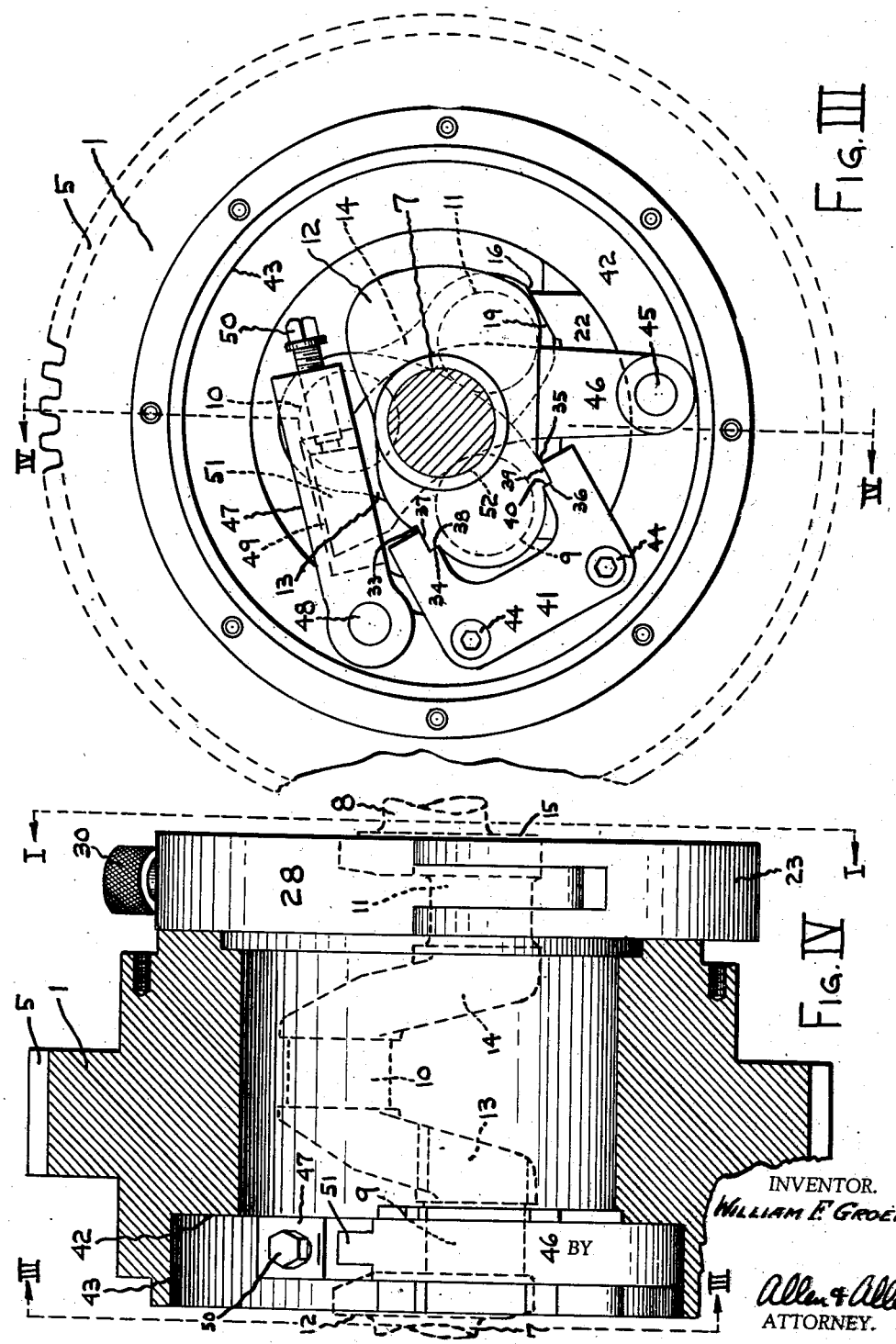
INVENTOR.
WILLIAM F GROENE.
BY
Allen & Allen
ATTORNEY.

Patented Jan. 25, 1938

2,106,501

UNITED STATES PATENT OFFICE 2,106,501

CHUCK

William F. Groene, Cincinnati, Ohio, assignor to The R. K. Le Blond Machine Tool Company, Cincinnati, Ohio, a corporation of Delaware Application August 17, 1936, Serial No. 96,356

15 Claims. (Cl. 82—40)

My invention relates to machine tool construction, and more especially to chucks for lathes or like machine tools. My invention is more particularly concerned with the turning of the line bearings on automotive crankshafts, although it will be understood that my invention is not limited to use in turning crankshafts. Such a use will, however be taken for purposes of illustration of my invention herein.

An object of my invention is to provide means for properly locating the work piece in the chuck, independently of any means outside of the chuck such as the usual conical lathe centers engaging depressions in the ends of the work piece; although it is practical and in some cases desirable to use such centers in connection with the chuck of my invention. It is undesirable to center a work piece such as a crankshaft by such conical lathe centers when these centers have to sustain the entire stress, not only by holding the work piece in location lengthwise of its axis, (which stress is comparatively light), but also by resisting the stress tending to move the work piece out of axial alignment with the chuck. This is because the edges of the central depressions in the ends of the work piece, become distorted and worn under such stresses, and will allow the shaft to move out of the center, particularly where heavy cuts are taken, as for instance in the rapid production of automotive crankshafts. It is my object, therefore, to hold the work piece in proper centered and axial position in the chuck by engagement with portions of the work piece alongside of or between those portions of the work piece which are to be machined. For instance, in the case of automotive crankshafts, the chuck is adapted to engage a plurality of axially disposed crankshaft webs, previously finished in accurate definite relation to the desired center of turning. In this respect my present invention is related to the inventions disclosed and claimed in Patents 1,843,359 of February 2, 1932; 1,934,976 of Nov. 14, 1933; Re. 19,905 of March 31, 1936; 2,030,020 of February 4, 1936; and Re. 20,090 of September 1, 1936.

My present invention differs generally from the disclosures of the patents referred to above in that I have provided, in a single chucking device, the desirable features which formerly could be obtained only by means of a plurality of chucking devices. The result of my present invention is that I have greatly simplified the structure of the former machines to which my invention is applied so that much mechanism, such as the means for driving a plurality of chucking devices in synchronism, and the centering devices for the ends of the work pieces or crankshafts, has been wholly eliminated while at the same time equal or greater efficiency in the operation of the machine is had.

An object of my invention is to provide a chuck for gripping and driving an irregular work piece which automatically definitely locates the work piece in proper centered, axially aligned, and indexed position relative to the axis of rotation of the chuck, by engaging minor pre-machined finished locating areas on the work piece.

Another object is to provide in a chuck means for gripping a crankshaft so as automatically to locate the crankshaft definitely with its line bearings properly centered and axially aligned relative to the axis of turning of the lathe, and also definitely to index the crank pins of the crankshaft relative to the chuck.

Another object is to provide, in a single center drive chuck, means engaging a plurality of webs of a crankshaft, so as automatically to locate the crankshaft definitely in proper centered, axially aligned and indexed position in the lathe.

Still another object of my invention is to provide a plurality of locating and chucking devices in a single center drive chuck adapted to grip a plurality of webs of a crankshaft so as to expose all of the line bearings of a crankshaft in order that all of said line bearings may be machined simultaneously.

It is also within the scope of my invention to provide relatively small finished locating areas on a plurality of webs of a crankshaft which are engaged by a plurality of mating locating areas axially disposed in the chuck body for the purpose of properly locating said work in axial alignment in the chuck.

Further objects will appear in the course of the following description in which:

Fig. I is an end elevation partly in section on line I—I of Fig. IV showing the locating and chucking mechanism.

Fig. II is a side elevation partly in section on line IV—IV of Fig. I, through a center drive chuck showing a method of rotatably mounting the driving ring gear and also a portion of the chucking and locating device of Fig. I.

Fig. III is an end elevation partly in section on line III—III of Fig. IV showing the locating and chucking mechanism at the opposite end of the ring gear from that shown in Fig. I.

Fig. IV is a side elevation partly in section on the line IV—IV of Figs. I and III showing both locating and chucking devices applied to the ring gear and a crankshaft loaded in chucking device.

For illustrative purposes I have shown my invention applied to a center drive type of chucking device wherein a work piece is chucked intermediate its ends so that machining operations may be carried on each side of the chucking device. My invention is not limited to the center drive type of chucking device, and is well adapted to chucking devices in which the work is not chucked intermediate its ends.

The center drive chuck here illustrated comprises the usual ring gear 1 journaled in suitable bearings 2 which bearings are fixed by means of screws 3 to the housing 4 of a lathe. The gear 5 is driven from a suitable pinion 6 which pinion in turn is driven by a source of power so that the ring gear 1 may be rotated at cutting speed for machining operations.

As an exemplary disclosure of a work piece chucked in this chucking device, I show a portion of a crankshaft comprising the line bearings 7 and 8; pin bearings 9, 10, and 11; and the respective connecting webs 12, 13, 14, and 15. On each end of the ring gear 1, I provide positive locating and chucking mechanism adapted to engage the webs 12 and 15 of the crankshaft substantially of a character set forth in Patent 2,030,020 issued Feb. 4, 1936.

The web 15 of the crankshaft is provided with angularly related locating areas 16, 17, and 18 which are adapted to engage the respective mating locating areas 19, 20, and 21 provided on the locating block 22, which block is mounted on the segmental chuck plate 23 by means of suitable screws 24, the chuck plate in turn being fixed to the ring gear 1 by means of the screws 25 (see Figure I). Pivotally mounted on one end of the chuck plate 23 on a suitable pin 26 is the clamp bar 27 which is thus adapted to be swung across the work piece in the chuck to engage the web 15 at a point substantially opposite the locating block 22. A latch member 28 is pivotally mounted on an eccentric stud 29 carried in the other end of the chuck plate 23 and has a screw 30 at its outer end adapted to engage the outer end 31 of the clamp bar so as to hold the clamp bar securely in contact with the web 15 of the crank-shaft at the point 32 in a manner fully set forth in Patent 2,030,020.

The web 12 of the crankshaft is provided with angularly related locating areas 33, 34, 35, and 36 which are adapted to engage the respective mating locating areas 37, 38, 39, and 40 provided on the locating block 41, which block is fixed to the bottom 42 of the enlarged bore 43 of the ring gear 1 by means of screws 44 (see Figure III). Pivotally mounted on a stud 45 fixed in the bottom 42 of the bore 43 is the clamp bar 46, which is thus adapted to be swung across the work piece in the chuck to engage the crank pin 9 at a point substantially opposite the locating block 41. A latch member 47 is pivotally mounted on a stud 48 fixed in the bottom 42 of the bore 43 and has a cavity 49 and a clamping screw 50 which is adapted to engage the outer end 51 of the clamp bar 46 so that upon tightening the screw 50 the clamp bar is brought in firm contact with the crank pin 9 at the point 52, in a manner as substantially set forth in Patent 2,030,020.

It can thus be clearly seen that each of the locating blocks 22 and 41 serves automatically to center and index the respective webs 15 and 12 of the crankshaft and that by providing such locating means at each end of a center drive ring gear 1 I am able also to automatically axially align the crankshaft in a single center drive chuck and without the need of any exterior centering and axially aligning means such as the usual conical lathe centers.

The exact form of clamping mechanism is immaterial to my invention, its only requisite being that it effectively hold the work piece in secure engagement with the locating means in the chuck.

It is also to be noted that the chucking device of my invention is adapted to grip a crankshaft in such a way as to expose all of the line bearings so that said bearings may be machined simultaneously and at the same time serving as the sole means in a single center drive chuck properly to locate the crankshaft in centered, axially aligned and indexed position in the chuck.

While I have rather specifically set forth the details of certain examples of construction of my invention, I do not wish to be understood as being limited to those examples or such precise disclosure; but what I claim as new and desire to secure by Letters Patent is:—

1. In a chuck comprising a rotatable chuck body, and chucking means at both ends of said body, said chucking means comprising each a plurality of locating means axially displaced and at one side of the axis of rotation of the chuck body having fixed, interspaced areas accurately positioned relative to said axis for effective angularly related engagement with respective angularly related areas accurately located on opposite sides of a work piece relative to a proper center turning of the work piece, the aggregate effective engagement of the areas at both sides serving to locate the work piece in proper centered, axial aligned, and indexed position relative to said chuck body, and means on said chuck body to clamp the work piece to said areas whereby said work piece is held in said chuck body at a plurality of longitudinally interspaced points.

2. In a chuck for crankshaft lathes, the combination with a rotary chuck body of a plurality of fixed abutment means thereon definitely located relatively to the axis of the chuck and located to one side of said axis, said abutment means forming areas arranged for engagement with areas on a plurality of webs of the shaft to be turned, which areas are effectively widely spaced on said webs, and at at least one position on each of said webs include two areas, one at an angle to the other, whereby when said shaft is clamped thereagainst, a fixed, predetermined relation of the shaft with the chuck body is assured and whereby said abutment means comprise the sole means for centering, axially aligning, indexing and driving the shaft to be turned, and means on the chuck body for clamping said webs in place.

3. In a chucking device for crankshafts, in combination with a rotary chuck body, interspaced means providing each a plurality of fixed abutment means for contacting machined portions on a plurality of irregular crankshaft webs, and cooperating clamping means, said fixed abutment means having face portions so related as to center and axially align the crankshaft by means of its webs, at least one face portion being so related to the radius of the chuck as to have an indexing and driving function, said faces all being located to one side of the axis of said chuck so as to permit final placement of the crankshaft by a transverse movement against said faces, and said clamping means acting in a direction to force said webs against all of said faces.

4. In a chuck for crankshaft lathes, the combination of a rotary chuck body having clamping means for engaging and urging a shaft to be turned in a given direction and a plurality of groups of abutment means in said body opposing the clamping means and fixed with relation to the chuck body, each group of said abutment means comprising mutually opposing faces on opposite sides of the line of clamping direction and at one of said sides at least including two faces angularly related to each other.

5. In a chuck for crankshaft lathes, the combination of a rotary chuck body including a plurality of clamping means and a plurality of longitudinally interspaced groups of fixed abutment means each group arranged to engage a different one of the crankshaft webs when the crankshaft is gripped between them, certain web engaging faces of restricted area so related to the preformed shaft webs as to engage matching faces machined thereon, at least three faces being provided on each web, at least one face on each web being a driving face, and the gripping force being directionally confined to enforcing said facial engagement, no element of the force in enforcing one facial engagement opposing the enforcement of other facial engagements.

6. In a chuck comprising a rotatable chuck body, a plurality of axially displaced groups of locating means, each group at one side of the axis of rotation of the chuck body, having interspaced areas accurately positioned relative to said axis for effective oppositely directed engagement with respective areas accurately located on opposite sides of a work piece relative to a proper center of turning of the work piece, the aggregate effective engagement of the areas at both sides serving both to locate the work piece with said proper centered and axially aligned position with said axis of rotation, and to index the work piece in said chuck, and a plurality of means on said chuck body to clamp the work piece to said areas, said locating means being unitary members of approximate U-shape, with the ends of the U-shape having said areas of effective engagement with the work piece.

7. A process of treating unmachined crankshafts having webs, and bearings including axially aligned line bearings and axially displaced pin bearings, which comprises machining on said webs, at interspaced positions in the length of said work piece, interspaced work locating portions upon the same side of an axis of said work piece, at least one of said portions having divergently disposed work locating faces, chucking said work in a center drive chuck having axially interspaced locating means for engaging said work locating portions on said several webs, simultaneously finishing all of one type of said bearings, afterward rechucking said piece and finishing all of another type of said bearings, in said first chucking operation, said work piece being located in proper centered, axially aligned, and indexed position solely by the engagement of each of said work locating faces with work locating abutments on said chuck fixed with respect to the center of rotation of said chuck and clamping of said webs thereagainst, and in said second chucking operation said work locating portions serving at least an indexing function.

8. A process of treating unmachined crankshafts having webs, axially aligned line bearings, and axially displaced pin bearings, which comprises machining on said webs, at interspaced positions in the length of said work piece, interspaced work locating portions upon the same side of an axis of said work piece, at least one of said portions having divergently disposed work locating faces, and chucking said work piece in a center drive chuck having axially interspaced groups of locating abutments fixed with respect to the center of rotation of said chuck and engaging said work locating faces, and means to clamp said webs thereagainst, said locating means being the sole means for locating said work piece in proper centered, axially aligned, and indexed position in said chuck.

9. A process of treating crankshafts, or the like, having webs, and bearings including axially aligned line bearings and axially displaced pins, which process comprises machining on a pair of webs, interspaced work locating portions each located upon the same side of an axis of said work piece and at least one of said portions having divergently disposed work locating faces, so that said work piece may be chucked in a center drive chuck intermediate its ends and located in proper centered, axially aligned, and indexed position in said chuck solely by the engagement of said work locating faces on said pair of webs with work locating abutments on said chuck fixed with respect to the center of rotation of said chuck and the clamping of said webs thereagainst, with said pins exposed for pin turning or said line bearings exposed for line turning, whereby a plurality of said bearings may be finished at one time.

10. In a crankshaft lathe, a center drive chucking device comprising a frame, a ring gear rotatably mounted in said frame, means for rotating said ring gear, crankshaft web engaging means mounted at each end of said ring gear, and means to hold crankshaft webs engaged with said web engaging means, said web engaging means providing the sole means for locating said crankshaft in proper centered, axially aligned, and indexed position relative to the axis of turning of said lathe.

11. In a crankshaft lathe, a center drive chucking device comprising a ring gear, and crankshaft web engaging means mounted at each end of said ring gear, having members in which the web is seated and members movable to engage the webs above said seats, and means for forcing prepared portions of the webs against said seating members when the movable members are brought into engagement with the webs.

12. In a center drive crankshaft line bearing lathe, a center drive chucking device comprising a ring gear, a plurality of locating means mounted on said ring gear and adapted to engage a plurality of webs of a crankshaft, a plurality of clamping means adapted to hold said webs in contact with said locating means, said locating means being so positioned as to engage a plurality of webs adjacent line bearings of the crankshaft so that all of said line bearings may be displaced from said chucking device for simultaneous turning.

13. In a crankshaft lathe, a center drive chucking device comprising a frame, a ring gear rotatably mounted in said frame, means for rotating said ring gear, spaced abutments located to one side of the axis of rotation of said ring gear and at each end thereof adapted to engage webs between line bearings of a crankshaft, and means to hold said crankshaft webs engaged with said abutments, said abutments providing the sole means for locating said crankshaft in proper centered, axially aligned, and indexed position relative to the axis of turning of said lathe.

14. In a crankshaft lathe, a center drive chucking device comprising a frame, a ring gear rotatably mounted in said frame, means for rotating said ring gear, spaced abutments located to one side of the axis of rotation of said ring gear and at each end thereof adapted to engage webs between line bearings of a crankshaft, and clamping means to urge said webs against said abutments, said clamping means applying force along a line passing between said spaced abutments, said abutments providing the sole means for locating said crankshaft in proper centered, axially aligned, and indexed position relative to the axis of turning of said lathe.

15. In a single center drive crankshaft line bearing lathe, a chuck for supporting and rotating a crankshaft intermediate its ends so as to expose all of its line bearings and associated surfaces for simultaneous turning comprising a single ring gear rotatably mounted in the frame of the lathe, web engaging means in said chuck for engaging webs between and adjacent line bearings of said shaft, and clamping means in said ring gear to hold said web engaging means, serving to precisely locate said crankshaft in proper centered, axially aligned, and indexed position in said supporting and rotating means.

WILLIAM F. GROENE.